July 28, 1959     L. H. MORIN     2,896,285
BUTTON SHANKS
Filed June 7, 1954
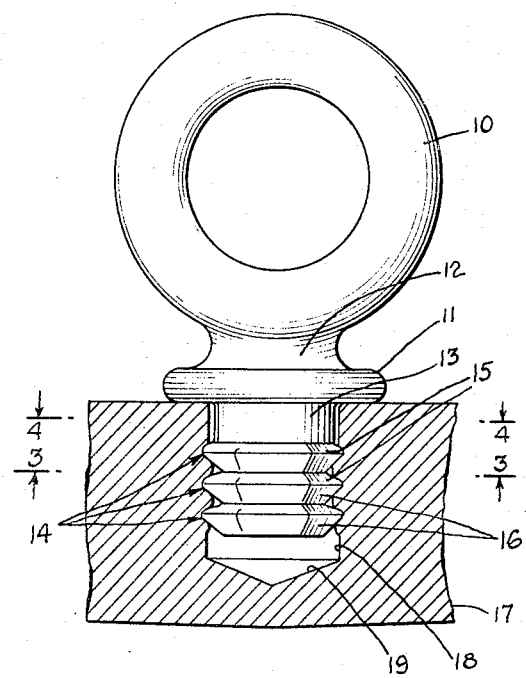
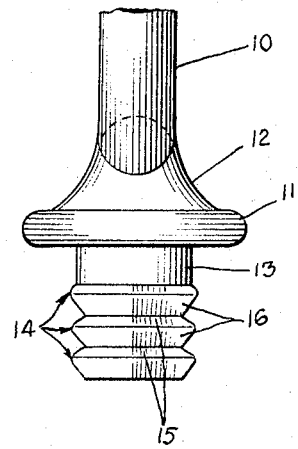
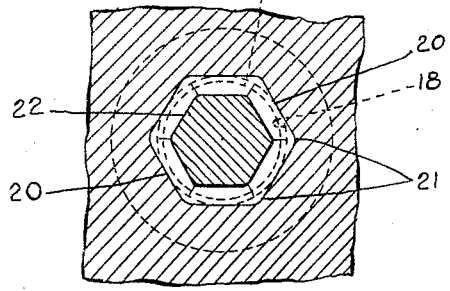
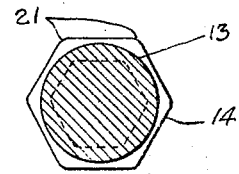
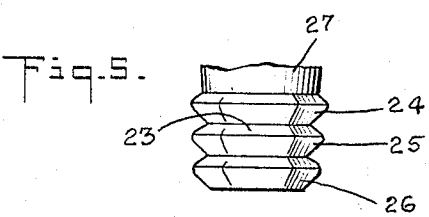
INVENTOR.
LOUIS H. MORIN
BY
*Howard Thompson*
ATTORNEY Patented July 28, 1959

2,896,285

BUTTON SHANKS

Louis H. Morin, Bronx, N.Y.

Application June 7, 1954, Serial No. 434,735

1 Claim. (Cl. 24—90)

This invention relates to what are generally referred to as shanks for mounting in pearl, plastic or other buttons. More particularly, the invention deals with a die cast button shank employing a plurality of tapered stepped lands or anchor portions, preferably formed on a body of angular contour, such for example as a hexagon, thus facilitating the press or drive mounting of the shank in the button.

Still more particularly, the invention deals with a shank, wherein the successive bevelled lands are arranged in a slight taper or, in other words, in reduced dimensions one with respect to the other.

The novel features of the invention will be best understood from the following description, when taken together with the accompanying drawing, in which certain embodiments of the invention are disclosed and, in which, the separate parts are designated by suitable reference characters in each of the views and in which:

Fig. 1 is a side view of a shank, showing part of a button in section, illustrating one of the shanks fixedly secured to the button by the lands of said shank.

Fig. 2 is a partial edge view of a shank taken at right angles to Fig. 1, showing the same detached.

Fig. 3 is a section on the line 3—3 of Fig. 1.

Fig. 4 is a section on the line 4—4 of Fig. 1 omitting the button; and

Fig. 5 is a view, similar to Fig. 1, showing only a part of the construction and illustrating a modification.

In Figs. 1 to 4, inclusive, I have shown one form of button shank device, which comprises an eye or loop body 10 and which may be termed the attaching end of the shank device. The device has a disc base 11, which joins the body 10 in an outwardly flared neck portion 12. Extending downwardly from the base is the shank proper, which comprises a cylindrical portion 13 adjacent the base. Beyond the cylindrical portion are a series of outwardly extending hexagonal lands or rib portions 14, three of which are shown in the accompanying drawing. Each of the lands or rib portions comprises a narrow outwardly tapered or bevelled wall portion 15, below which is an inwardly tapered or bevelled wider wall portion 16. The wall portions 15 and 16 contact or intersect at outer extremities of the ribs.

At 17, in Fig. 1 of the drawing, I have shown, in section, part of a pearl, plastic or other button, having a hole 18 therein and, when said hole is formed by the drilling, a countersunk portion 19 will automatically be formed by the drilling operation. In other methods of forming, this countersunk portion would not be employed.

The diameter of the hole 18 is substantially equal in dimensions to the distance between the opposed flat sides 20 of the hexagonal ribs, as is clearly indicated in Fig. 3 of the drawing, thus the protruding corners 21 which extend beyond the diameter of the aperture 18 form the gripping or coupling members, or lands, which force themselves into and definitely engage the material of the button, substantially in the manner diagrammatically shown in Fig. 1 of the drawing.

The shank between the ribs 14 is of hexagonal cross-section, as clearly noted at 22 in Fig. 3 of the drawing, which view shows a section between two of the ribs. It will, further, be noted that, in the structure shown, the cylindrical portion 13 is of smaller diameter than the diameter of the aperture 18.

In Fig. 5, the ribs 23 differ from the ribs 14 in that the ribs 23 are reduced in diameter in the direction of the end of the shank. In other words, the rib 24 is larger in diameter than the rib 25 and the rib 26 is smaller in diameter than the rib 25. This latter construction will be desirable in connection with some types of button bodies, or other members, in conjunction with which the shank is forcibly mounted. The slight taper will, in addition to the bevelled surfaces, further facilitate movement of the shank into the aperture or bore of the button or member.

The body portion 27 of the shank, shown in Fig. 5, can also be slightly tapered, conforming to the general contour of the device.

The illustrations in the accompanying drawing are materially exaggerated as to size. These so called shanks, including the integral loops or eyes, are employed on buttons of relatively small sizes and are used in sewing or otherwise attaching the button to a garment or other support. However, in other uses of the present conception, an attaching element, such as the shank device herein described, can be mounted in connection with any type or kind of support by utilizing the circumferentially spaced, as well as longitudinally spaced, lands or grippers on the true shank portion of the attaching element.

It will further be apparent that the element or shank device herein disclosed can simply and economically be formed as a die cast product, thus dispensing with machining and other operations which would be required in other methods of producing a device of this type and kind. The lands, or grippers, by virtue of their contracted prong-like form and bevelled surfaces, will readily cut into pearl, plastics and similar materials in establishing the desired anchorage. The resulting interlock, by reason of the hexagonal shape of the shank, holds the latter securely against turning in the hole as well as against withdrawal from it.

Having fully described my invention, what I claim as new and desired to secure by Letters Patent is:

In a shank for use with a button having a preformed hole, wherein said shank is driven in the hole, said shank having a part extending above the hole and a part extending into the hole, the improvement comprising a disc-shaped base portion on that part of the shank extending above the hole, said base portion being in contact with the button, an attaching end portion connected to said base portion, that part of the shank extending into the hole comprising an upper portion of circular cross-sectional shape and a lower portion of hexagonal cross-sectional shape, said lower portion comprising a plurality of superposed lands also of hexagonal cross-sectional shape, each of said land being defined by upper and lower surfaces that taper outwardly and meet to form a substantially sharp edge, said edge extending around the periphery of said land, said peripheral edge, by virtue of the hexagonal cross-sectional shape of the land, being characterized by having alternating straight sides and corners, said upper portion having a diameter smaller than the diameter of the hole, the distance between opposed straight sides of said land being substantially equal to the diameter of the hole, opposed corners of said peripheral edge being spaced apart a distance greater than the diameter of said hole, said shank having a drive fit in the hole arising from the forcible engagement of said corners with the walls of the hole, said forcible engagement serving to prevent withdrawal of the shank, and the hexagonal cross-sectional shape of said lands serving to prevent rotation of the shank.

References Cited in the file of this patent

UNITED STATES PATENTS

| | | |
|---|---|---|
| 538,342 | Noelting et al. | Apr. 30, 1895 |
| 1,383,591 | Angle | July 5, 1921 |
| 1,817,775 | Sipe | Aug. 4, 1931 |
| 2,016,610 | Moeller | Oct. 8, 1935 |
| 2,024,071 | Taylor et al. | Dec. 10, 1935 |
| 2,026,380 | Feuerstein | Dec. 31, 1935 |
| 2,304,036 | Tegarty | Dec. 1, 1942 |
| 2,759,389 | Corckran | Aug. 21, 1956 |

FOREIGN PATENTS

| | | |
|---|---|---|
| 22,397 | Great Britain | 1906 |
| 24,406 | Germany | Feb. 14, 1883 |